(12) United States Patent
Lim et al.

(10) Patent No.: US 10,156,892 B2
(45) Date of Patent: Dec. 18, 2018

(54) DISPLAY DEVICE AND METHOD FOR DRIVING THE SAME

(71) Applicant: LG DISPLAY CO., LTD., Seoul (KR)

(72) Inventors: Wansik Lim, Paju-si (KR); Dowan Kim, Paju-si (KR); Subin Park, Jeonju-si (KR); Jungyoup Suk, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/358,856

(22) Filed: Nov. 22, 2016

(65) Prior Publication Data

US 2017/0147063 A1    May 25, 2017

(30) Foreign Application Priority Data

Nov. 24, 2015   (KR) ..................... 10-2015-0164911

(51) Int. Cl.
  G09G 3/34       (2006.01)
  G09G 3/36       (2006.01)
  G09G 3/3291     (2016.01)
  G06F 1/32       (2006.01)
  G09G 3/32       (2016.01)

(52) U.S. Cl.
  CPC ......... *G06F 1/3296* (2013.01); *G09G 3/3291* (2013.01); *G09G 3/342* (2013.01); *G09G 3/3685* (2013.01); *G09G 3/3696* (2013.01); *G09G 2310/027* (2013.01); *G09G 2310/08* (2013.01); *G09G 2330/021* (2013.01); *G09G 2330/023* (2013.01); *G09G 2340/0435* (2013.01)

(58) Field of Classification Search
  CPC .... G06F 1/3296; G09G 3/3291; G09G 3/342; G09G 3/3685; G09G 3/3696
  See application file for complete search history.

(56) References Cited

U.S. PATENT DOCUMENTS

| | | | |
|---|---|---|---|
| 2007/0008273 A1 | 1/2007 | Chen et al. | |
| 2013/0222359 A1* | 8/2013 | Nakata .................. | G09G 3/3614 345/212 |
| 2014/0009510 A1 | 1/2014 | Jin | |
| 2015/0255042 A1* | 9/2015 | Oh .......................... | G09G 5/18 345/212 |
| 2017/0039967 A1* | 2/2017 | Jung ..................... | G09G 3/3648 |

FOREIGN PATENT DOCUMENTS

| | | |
|---|---|---|
| KR | 101076449 B1 | 10/2011 |
| KR | 10-2016-0082877 A | 7/2016 |

* cited by examiner

*Primary Examiner* — Kevin M Nguyen
(74) *Attorney, Agent, or Firm* — Dentons US LLP

(57) ABSTRACT

Provided are a display device and a method for driving the same. A display device comprises a display panel, a data driver, and a power saving part. The display panel displays an image. The data driver supplies a data signal to the display panel. The power saving part controls a reference source for the data driver according to the display mode of the display panel.

11 Claims, 9 Drawing Sheets

DISPLAY DEVICE AND METHOD FOR DRIVING THE SAME

This application claims the priority benefit of Korean Patent Application No. 10-2015-0164911 filed on Nov. 24, 2015, which is hereby incorporated herein by reference for all purposes as if fully set forth herein.

BACKGROUND

Field

The present disclosure relates to a display device and a method for driving the same.

Discussion of the Related Art

With the development of information technology, the market for displays that play an intermediary role between users and information is growing. Thus, display devices such as organic light-emitting displays (OLEDs), quantum dot displays (QDDs), liquid crystal displays (LCDs), and plasma display panels (PDPs) are increasingly used.

These display devices each comprise a display panel comprising a plurality of subpixels, a drive part that outputs a drive signal to drive the display panel, a power supply that generates and supplies power to the drive part.

A display device comes in a small, medium, or large size. For a small display, power consumption even in milliwatts plays an important role to determine battery lifetime. For this reason, various methods for improving the operation time (execution time) of small or medium displays have been proposed.

In order to improve the operation (execution) time of small or medium displays, the display panel is typically temporarily turned off, or the luminance is lowered, during a display-off period, in which no image is displayed on the display panel. Also, the drive frequency of the display panel is lowered during this period. However, these conventional methods still need further improvement.

SUMMARY

Accordingly, the present disclosure is directed to a display device and a method for driving the same that substantially obviate one or more problems due to limitations and disadvantages of the related art.

An advantage of the present disclosure is to provide a display device with reduced power consumption.

Additional features and advantages of the present disclosure will be set forth in the description which follows, and in part will be apparent from the description, or may be learned by practice of the invention. These and other advantages of the present invention will be realized and attained by the structure particularly pointed out in the written description and claims hereof as well as the appended drawings.

To achieve these and other advantages and in accordance with the purpose of embodiments of the invention, as embodied and broadly described herein, a display device may, for example, include a display panel, a data driver, and a power saving part. The display panel displays an image. The data driver supplies a data signal to the display panel. The power saving part controls a reference source for the data driver according to the display mode of the display panel.

In another aspect, a method for driving a display device may, for example, include analyzing an input image to determine a display mode of a display panel; selecting either a per-frame dimming or a per-horizontal line dimming when the display mode is a power-saving mode; and controlling a reference source for a data driver according to the selected dimming method.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments illustrated in the accompanying drawings, examples of which are illustrated in the accompanying drawings.

A concrete embodiment of the present disclosure will be described below with reference to the accompanying drawings.

Figure 1:
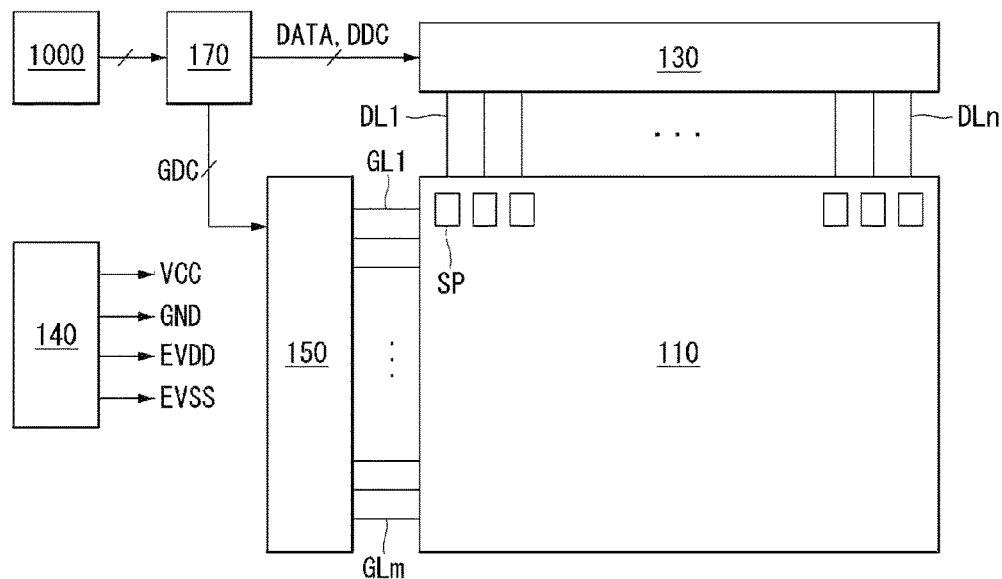
FIG. 1 is a block diagram schematically illustrating a display device according to an exemplary embodiment of the present disclosure.
Figure 2:
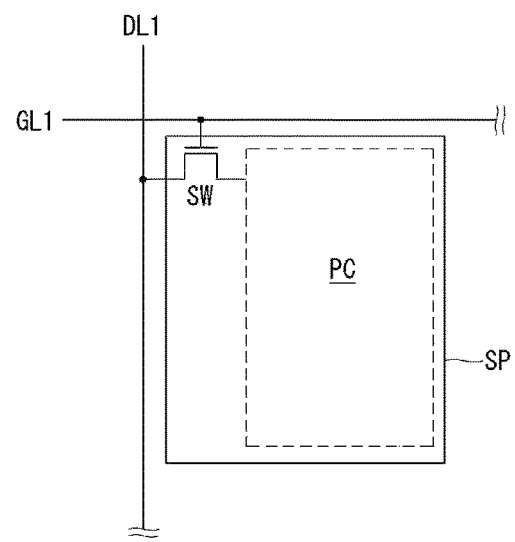
FIG. 2 is a view schematically illustrating a configuration of a subpixel of FIG. 1.

FIG. 1 is a block diagram schematically showing a display device according to an exemplary embodiment of the present disclosure. FIG. 2 is a view schematically showing the configuration of a subpixel of FIG. 1.

As illustrated in FIG. 1, the display device basically comprises a host system 1000, a timing controller 170, a data driver 130, a power supply 140, a gate driver 150, and a display panel 110.

The host system 1000 comprises a system-on-chip (SoC) with a scaler embedded in it, and converts digital video data of an input image into a data signal in a format suitable for display on the display panel 110. The host system 1000 transmits various timing signals, together with the data signal, to the timing controller 170.

The timing controller 170 controls the operation timings of the data driver 130 and gate driver 150 based on timing signals, such as a vertical synchronization signal, horizontal synchronization signal, data enable signal, and main clock, received from the host system 1000. The timing controller 170 performs image processing (such as data compensation, etc.) of the data signal received from the host system 1000 and supplies it to the data driver 130.

The data driver 130 operates in response to a first drive signal DDC, etc. output from the timing controller 170. The data driver 130 converts a digital data signal DATA received from the timing controller 170 to an analog data signal and outputs it. The data driver 130 converts a digital data signal DATA to an analog data signal in response to a gamma voltage GMA of a gamma part provided internally or externally. The data driver 130 supplies a data signal to data lines DL1 to DLn of the display panel 110.

The gate driver 150 operates in response to a second drive signal GDC, etc. output from the timing controller 170. The gate driver 150 outputs a gate signal (or scan signal) at a gate-high voltage or gate-low voltage. The gate driver 150 may sequentially output a gate signal in a forward or backward direction. The gate driver 150 supplies a gate signal to gate lines GL1 to GLm of the display panel 110.

The power supply 140 produces a first voltage source VCC and GND for driving the data driver 130, etc. and a second voltage source EVDD and EVSS for driving the display panel 110. Besides, the power supply 140 generates voltages to drive the display device, such as the gate-high voltage, gate-low voltage, etc., that are delivered to the gate driver 150.

The display panel 110 comprises subpixels SP, the data lines DL1 to DLn connected to the subpixels SP, and the gate lines GL1 to GLm connected to the subpixels SP. The display panel 110 displays an image in response to a gate signal output from the gate driver 150 and a data signal DATA output from the data driver 130. The display panel 110 comprises a lower substrate and an upper substrate. The subpixels SP are formed between the lower substrate and the upper substrate.

As illustrated in FIG. 2, one subpixel comprises a switching thin-film transistor SW connected to the gate line GL1 and data line DL1 (or formed at the intersection), and a pixel circuit PC that operates in response to a data signal DATA supplied through the switching thin-film transistor SW.

The display panel 110 is implemented as a liquid crystal display panel or an organic light-emitting display panel according to the configuration of the pixel circuits PC of the subpixels SP. If the display panel 110 is implemented as a liquid crystal display panel, it operates in TN (Twisted Nematic) mode, VA (Vertical Alignment) mode, IPS (In-Plane Switching) mode, FFS (Fringe Field Switching) mode, or ECB (Electrically Controlled Birefringence) mode. If the display panel 110 is implemented as an organic light-emitting display panel, it operates as a top-emission type, bottom-emission type, or dual-emission type.

The above-explained display device may be implemented for a television system, a set-top box, a navigation system, a video player, a Blu-ray player, a personal computer (PC), a wearable device, a home theater system, a mobile phone, etc.

The display panel of the display device may be a liquid crystal display panel, an organic light-emitting display panel, an electrophoretic display panel, a quantum dot display panel, a plasma display panel, etc. For convenience of explanation, a display device having an organic light-emitting display panel will be described below by way of an example of the display panel.

The display device to be described below may come in a small, medium, or large size. It may exhibit greater capability when implemented as a small or medium display that requires low power consumption.

By way of example, a smartwatch, which is a type of small display, according to an exemplary embodiment of the present disclosure will be described. In the case of the smartwatch to be described below, it is possible to temporarily turn off the display panel or lower the luminance, during a display-off period, in which no image is displayed on the display panel, and also possible to lower the drive frequency of the display panel during this period, but descriptions thereof will be omitted. Moreover, the following description will be given of an example in which one pixel consists of red, green, and blue subpixels RGB. However, it should be noted that this is just an illustration and the present disclosure is not limited thereto.

Figure 3:
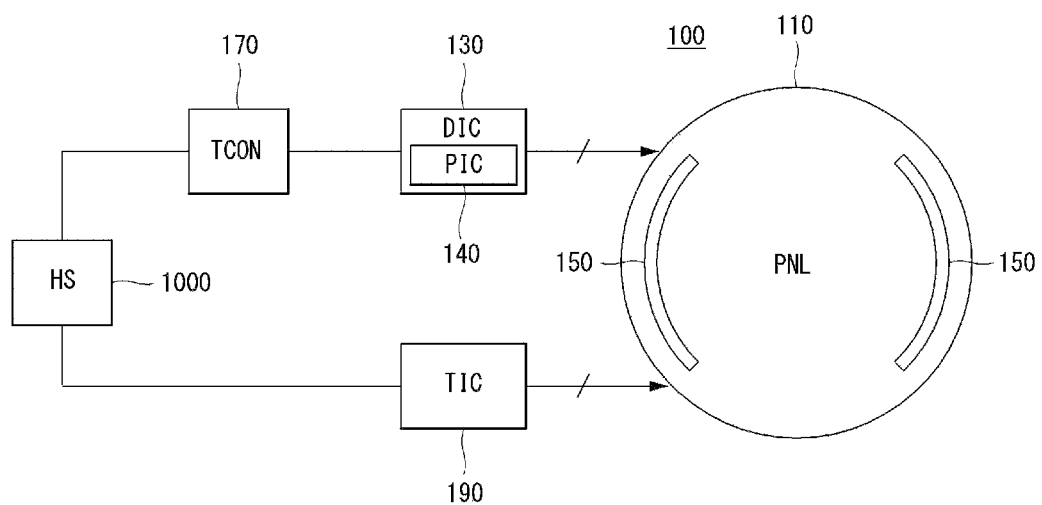
FIG. 3 is a block diagram schematically illustrating a smartwatch according to an exemplary embodiment of the present disclosure.
Figure 4:
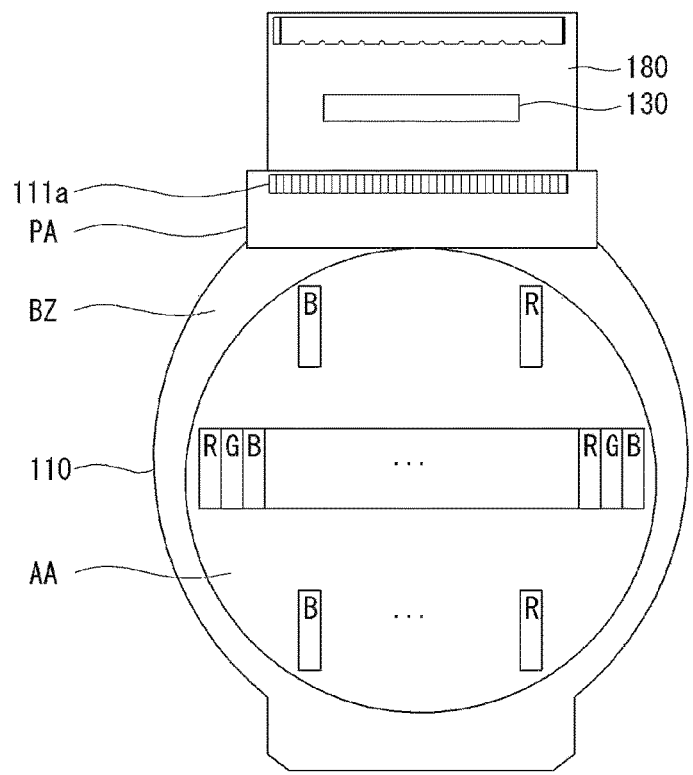
FIG. 4 is a top plan view schematically illustrating a display panel for a smartwatch.

FIG. 3 is a block diagram schematically showing a smartwatch according to an exemplary embodiment of the present disclosure. FIG. 4 is a top plan view schematically showing a display panel for a smartwatch.

As illustrated in FIG. 3, a smartwatch 100 comprises a host system (HS) 1000, a timing controller (TCON) 170, a data driver (DIC) 130, a power supply (PIC) 140, a gate driver 150, a display panel (PNL) 110, and a touch driver 190.

The smartwatch 100 corresponds to a small display. In the small display, some parts of the device are integrated to reduce the device's complexity. For example, the power supply 140 may be included within the data driver 130. However, this is just an illustration, and the small display may be implemented in a variety of configurations, including integrating the timing controller 170 and the data driver 130 into a single unit.

The gate driver 150 is embedded in the display panel 110, together with a pixel array. The gate driver 150 embedded in the display panel 110 is formed by the GIP (gate-in-panel) technology, along with a thin-film transistor process.

The smartwatch 100 has the touch driver 190 as touch-type input means to help the user input data. Moreover, the display panel 110 comprises touch sensors that sense a touch position using the touch driver 190 and output the value of the sensed position, and sensor lines that electrically connect the touch sensors and the touch driver 190.

The touch driver 190 detects information on the position of a finger touch using self-capacitive touch sensors or mutual capacitive touch sensors. The touch driver 190 transmits the detected information on the position of the finger touch to the host system 1000. The host system 1000 executes an application associated with the touch position information received from the touch driver 190.

As illustrated in FIG. 4, the display panel 110 may be formed in a circular shape, for example. As well as the circular shape, the display panel 110 may be formed in various shapes including a square shape, rectangular shape, polygonal shape, elliptical shape, etc.

Red, green, and blue subpixels R, G, and B and touch sensors (not shown) are placed in a display area AA of the display panel 110. A pad part 111a may be placed in a pad area PA defined in a non-display area (or bezel region) BZ of the display panel 110. By way of example, the pad part 111a is placed on top of the display area AA, but also may be placed under the display area AA.

The data driver 130—which may be implemented as an integrated circuit, instead of the data driver—is mounted on a flexible circuit substrate 180. The flexible circuit substrate 180 is electrically connected to the pad part 111a through an anisotropic conductive film (ACF), etc.

As stated above, for a small display, power consumption even in milliwatts plays an important role to determine battery lifetime. For this reason, various methods for improving the operation time (execution time) of small or medium displays have been conventionally proposed.

In order to improve the operation time (execution time) of small or medium displays, the display panel is typically temporarily turned off, or the luminance is lowered, during a display-off period, in which no image is displayed on the display panel. Also, the drive frequency of the display panel is lowered during this period. However, these conventional methods still need further improvement.

Hereinafter, a power saving method according to a test example will be considered, and an exemplary embodiment for improving this method will be described.

Figure 5:
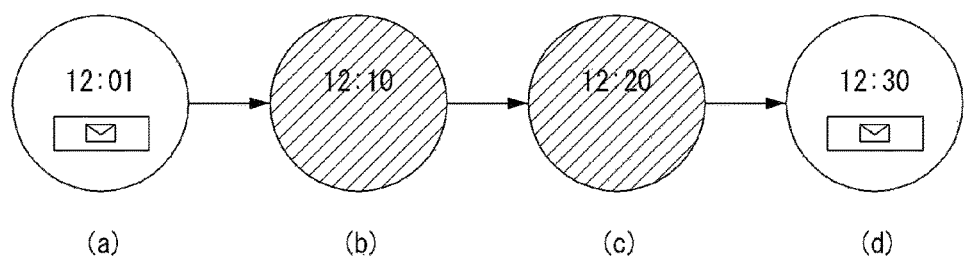
FIG. 5 is a view illustrating changes on the display panel according to a power saving method.
Figure 6:
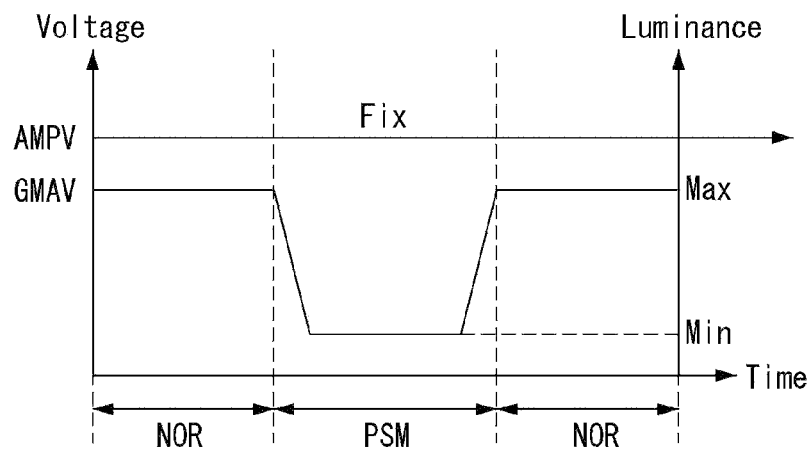
FIG. 6 is a voltage waveform diagram for explaining a power saving method according to a test example.

FIG. 5 is a view showing changes on the display panel according to a power saving method. FIG. 6 is a voltage waveform diagram for explaining a power saving method according to a test example.

As illustrated in FIG. 5, in order to improve the operation time (execution time) of small or medium displays, the display panel is temporarily turned off, or the luminance is lowered, during a display-off period, in which no image is displayed on the display panel.

The portions (a) and (d) of FIG. 5 corresponding to a display-on period, in which an image is displayed on the display panel, may be defined as normal mode since the display panel operates in a normal way. By contrast, the portions (b) and (c) of FIG. 5 corresponding to a display-off period, in which no image is displayed on the display panel, may be defined as power-saving mode since the display panel operates in a way that reduces power consumption.

As illustrated in FIG. 6, in the power saving method according to the test example, when the display mode of the display panel changes from normal mode NOR to power-saving mode PSM, the gamma converter voltage GMAV supplied to a gamma converter Gamma DAC is varied.

For example, when the display mode is normal mode NOR, maximum voltage Max is supplied to the gamma converter Gamma DAC of the data driver. By contrast, when the display mode is power-saving mode PSM, minimum voltage Min is supplied to the gamma converter Gamma DAC of the data driver. Varying the gamma converter voltage GMAV supplied to the gamma converter Gamma DAC varies the luminance.

As such, in order to change the voltage supplied to the gamma converter Gamma DAC of the data driver, the output voltage of the power supply can be regulated, or the internal voltage of the data driver can be regulated.

Internal voltage refers to the voltage that the data driver generates by itself based on the voltage output from the power supply, for the purpose of using it to drive the devices included in the data driver. That is, another voltage is generated based on the voltage output from the power supply because each device operates at a different voltage.

Meanwhile, the result of a test regarding power consumption showed that, in the method according to the test example, even with power-saving mode PSM on, there was no reduction (decrease) in current consumption, even on a basic level, due to static and dynamic current components consumed in the data driver.

The static current in the data driver refers to the current consumed by the power-supply voltage supplied by default to amplifiers even when the data driver produces no output through its output channel. The dynamic current in the data driver refers to the current consumed by the power-supply voltage supplied to the amplifiers at the output when the data driver outputs a data signal corresponding to a particular image through its output channel.

Looking into the cause of this revealed that, in the method according to the test example, the amplifier voltage AMPV at the output of the data driver is fixed to a single voltage value, regardless of a change of the display mode.

In view of the above test results, a method capable of further reducing power consumption will now be described according to an embodiment of the present disclosure.

Figure 7:
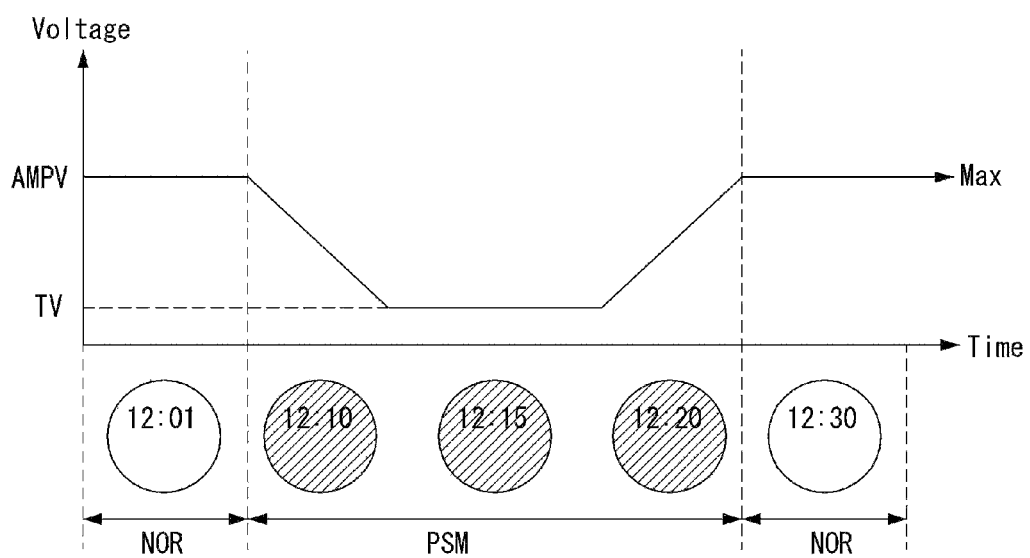
FIG. 7 is a voltage waveform diagram for explaining a power saving method according to an exemplary embodiment of the present disclosure.
Figure 8:
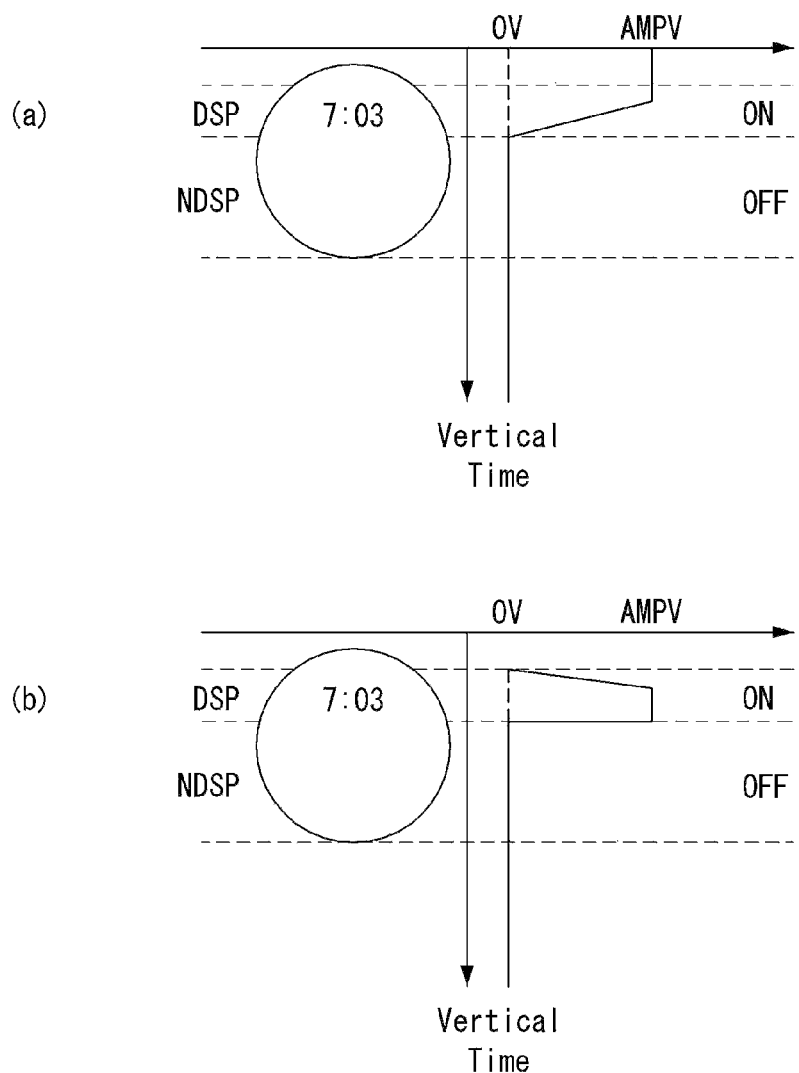
FIG. 8 is a view illustrating an example of application of the power saving method according to the exemplary embodiment of the present disclosure.
Figure 9:
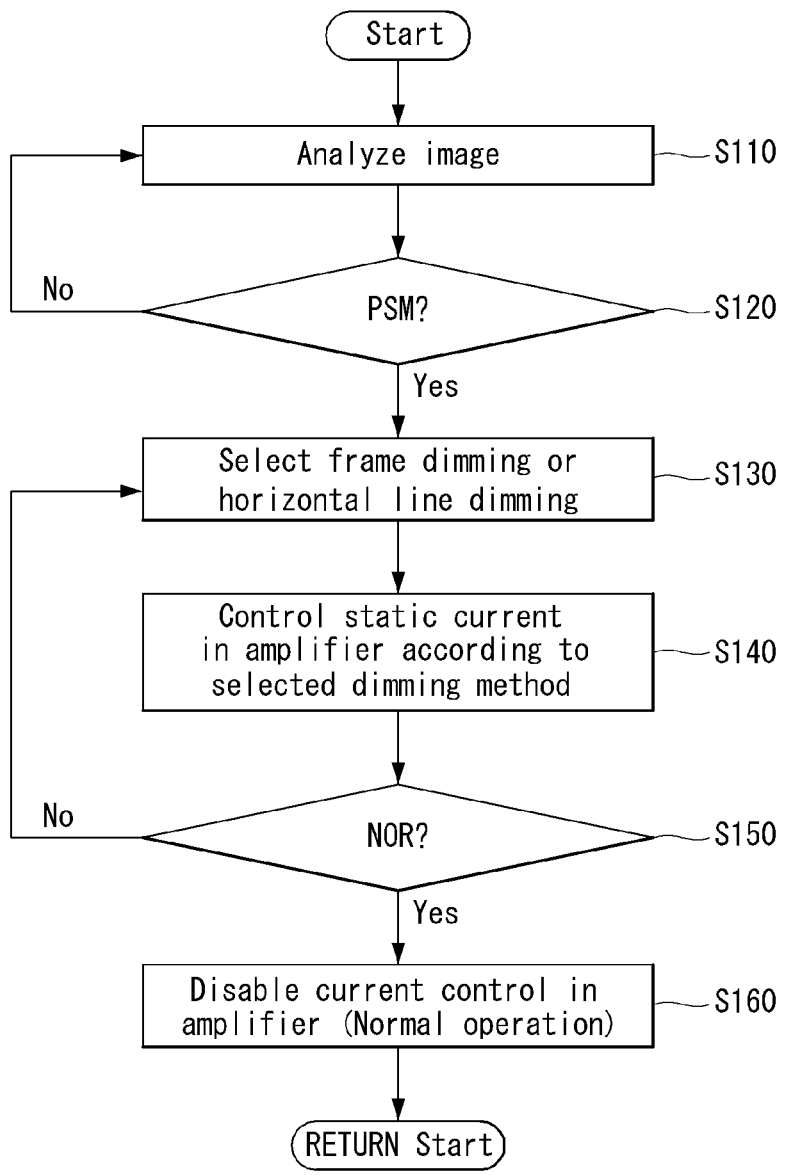
FIG. 9 is a flowchart for explaining the power saving method according to the exemplary embodiment of the present disclosure.

FIG. 7 is a voltage waveform diagram for explaining a power saving method according to an exemplary embodiment of the present disclosure. FIG. 8 is a view showing an example of application of the power saving method according to the exemplary embodiment of the present disclosure. FIG. 9 is a flowchart for explaining the power saving method according to the exemplary embodiment of the present disclosure.

As illustrated in FIG. 7, in the power saving method according to the exemplary embodiment of the present disclosure, when the display mode of the display panel changes from normal mode NOR to power-saving mode PSM, the gamma converter voltage GMAV supplied to the gamma converter Gamma DAC of the data driver is varied. FIG. 7 depicts an example of current consumption reduction on a per-frame basis when the display mode is power-saving mode PSM.

As an example, when the display mode is normal mode NOR, maximum voltage Max is supplied to the gamma converter Gamma DAC of the data driver. By contrast, when the display mode is power-saving mode PSM, minimum voltage Min is supplied to the gamma converter Gamma DAC of the data driver. Varying the gamma converter voltage GMAV supplied to the gamma converter Gamma DAC varies the luminance.

Also, when the display mode of the display panel changes from normal mode NOR to power-saving mode PSM, the amplifier voltage AMPV supplied to the amplifiers AMP of the data driver is varied.

As an example, when the display mode is normal mode NOR, maximum voltage Max is supplied to the amplifiers in the data driver. By contrast, when the display mode is power-saving mode PSM, a target voltage TV is supplied to the amplifiers in the data driver. The target voltage TV is a value obtained based on a preliminary test, which may correspond to minimum voltage or a voltage equivalent to it.

The method of varying the amplifier voltage AMPV supplied to the amplifiers AMP in the data driver may vary as follows, depending on whether an image is displayed or not. FIG. 8 to be described below depicts an example of voltage variation when driving such an area as a clock display area that can be driven in power-saving mode PSM. The circular portion of FIG. 8 indicates the display area.

As shown in (a) of FIG. 8, when the data driver drives a clock display area DSP, the output of the data driver remains in the on state, but the amplifier voltage AMPV decreases from maximum voltage to a target voltage or drops to 0 V with a certain gradient. On the contrary, if the data driver moves out of the clock display area DSP and reaches a time non-display area NDSP, the output of the data driver turns off and the amplifier voltage AMPV drops to 0 V. That is, no voltage is supplied to the amplifiers in the data driver.

As shown in (b) of FIG. 8, when the data driver drives the clock display area DSP, the output of the data driver remains in the on state, but the amplifier voltage AMPV rises from 0 V or the target voltage to the maximum voltage. On the contrary, if the data driver moves out of the clock display area DSP and reaches the time non-display area NDSP, the output of the data driver turns off and the amplifier voltage AMPV drops to 0 V. That is, no voltage is supplied to the amplifiers in the data driver.

(a) of FIG. 8 depicts an example where the amplifier voltage AMPV varies by fading in, for the area where power-saving mode is running, and (b) of FIG. 8 depicts an example where the amplifier voltage AMPV varies by fading out, for the area where power-saving mode is running. As illustrated in FIG. 8, the concept of per-horizontal line dimming involves controlling the output channel of the data driver per unit of vertical time.

According to the above examples, the data driver varies the amplifier voltage AMPV on the data lines (corresponding to the display area) where power-saving mode is running during 1 frame period. Also, the data driver drops the amplifier voltage AMPV to 0 V or the target voltage on the data lines (corresponding to the non-display area) where no output is produced.

As in the exemplary embodiment of the present disclosure, the result of varying the voltage supplied to the amplifiers AMP as well as the voltage supplied to the gamma converter Gamma DAC of the data driver showed that the static current was reduced to zero or close to it and as much dynamic current as needed for display area was consumed.

To drive the display device in the way it was driven in the exemplary embodiment of the present disclosure, the device needs to be driven according to the following sequence of FIG. 9.

A driving method according to an exemplary embodiment of the present disclosure comprises: analyzing an input image and determining whether the display mode of a display panel is power-saving mode or not; if the display mode of the display panel is power-saving mode, selecting either per-frame dimming or per-horizontal line dimming; and controlling a reference source (or reference power) for a data driver according to the selected dimming method.

First of all, an input image is analyzed (S110). By analyzing the format of an input image data signal, power-saving mode may be performed in accordance with a particular image. For example, power-saving mode may be performed as agreed upon with the user.

The display panel may go into power-saving mode PSM when: (1) still images are repeated, (2) there is no image that continues to exist in a particular area (or particular line), (3) an image agreed upon with the user is displayed on the display panel, or (4) a screensaver image is displayed on the display panel, but the present disclosure is not limited thereto.

Although it is not necessary that image analysis be done in advance to go into power-saving mode PSM, the following description will be given based on image analysis by way of example.

Next, it is determined whether the display mode is power-saving mode PSM or not (S120). If the display mode is not power-saving mode (No), image analysis is performed until the display panel goes into power-saving mode PSM.

Next, if the display mode is not power-saving mode (Yes), either per-frame dimming or per-horizontal line dimming is selected (S130). In an example, in the per-frame dimming method, the amplifier voltage may be varied so that the amplifiers have a first amplifier voltage for an Nth frame, a second amplifier voltage for an (N+1)th frame, and a third amplifier voltage for an (N+2)th frame. In this case, the level of the amplifier voltage may be varied in the following order: first amplifier voltage→second amplifier voltage→third amplifier voltage, or in reverse order.

In another example, in the per-horizontal line dimming method, the amplifier voltage may be varied so that the amplifiers have a first amplifier voltage for the data lines located on a first scan line, a second amplifier voltage for the data lines located on an (N+1)th scan line, and a third amplifier voltage for the data lines located on an (N+2)th scan line. In this case, the level of the amplifier voltage may be varied in the following order: first amplifier voltage→second amplifier voltage→third amplifier voltage, or in reverse order.

Analyzing an input image in this way offers the advantage of selectively performing power-saving mode PSM in accordance with the characteristics of the image (e.g., the display area of the image can be divided).

Next, the current in the amplifiers is controlled according to the selected dimming method (S140). The current in the amplifiers may be controlled in such a way that either or both of the static current and dynamic current are controlled according to the configuration of power-saving mode PSM.

Next, it is determined whether the display panel goes into normal mode NOR or whether power-saving mode is at an ending stage or not (S150). If the display panel does not go into normal mode NOR (No), the selection S130 of either per-frame dimming or per-horizontal line dimming and the subsequent steps may be repeated.

Next, if the display panel goes into normal mode NOR (Yes), the current control in the amplifiers is disabled (S160). Once the current control in the amplifiers is disabled, the amplifier voltage returns to the maximum voltage and the display mode is switched to normal mode NOR, and therefore the display device is brought to its normal operating state.

In what follows, the essential parts for implementing a display device according to an exemplary embodiment of the present disclosure and an example of implementation based on them will be described.

Figure 10:
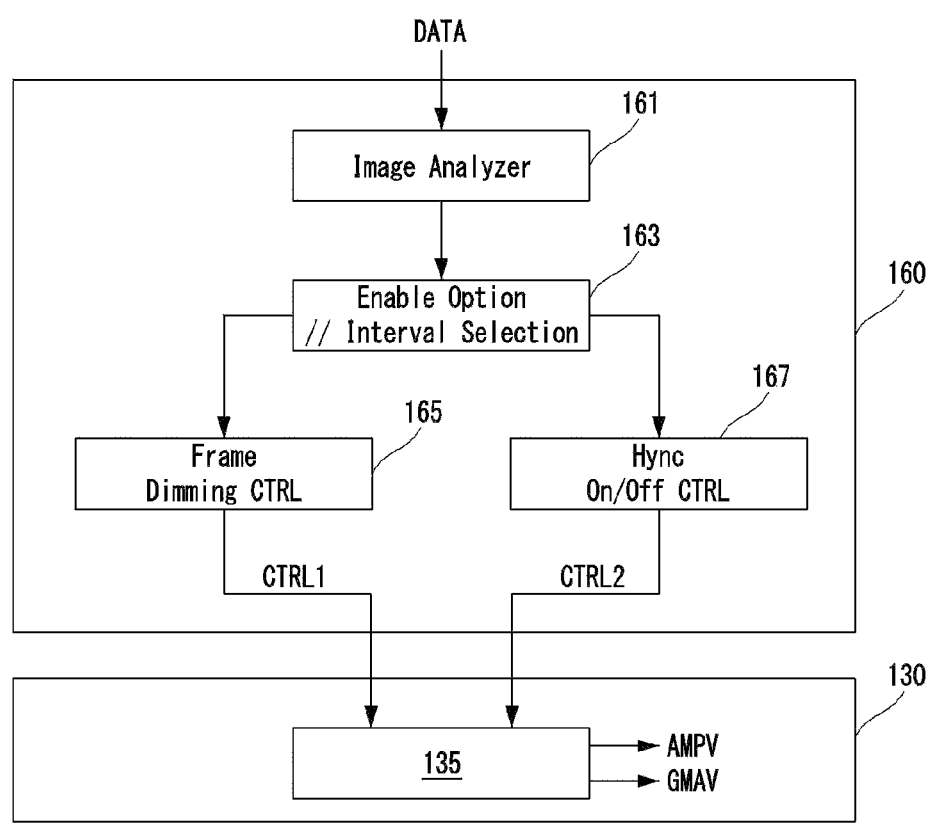
FIGS. 10 and 11 are block diagrams for explaining some parts of a display device according to an exemplary embodiment of the present disclosure.
Figure 11:
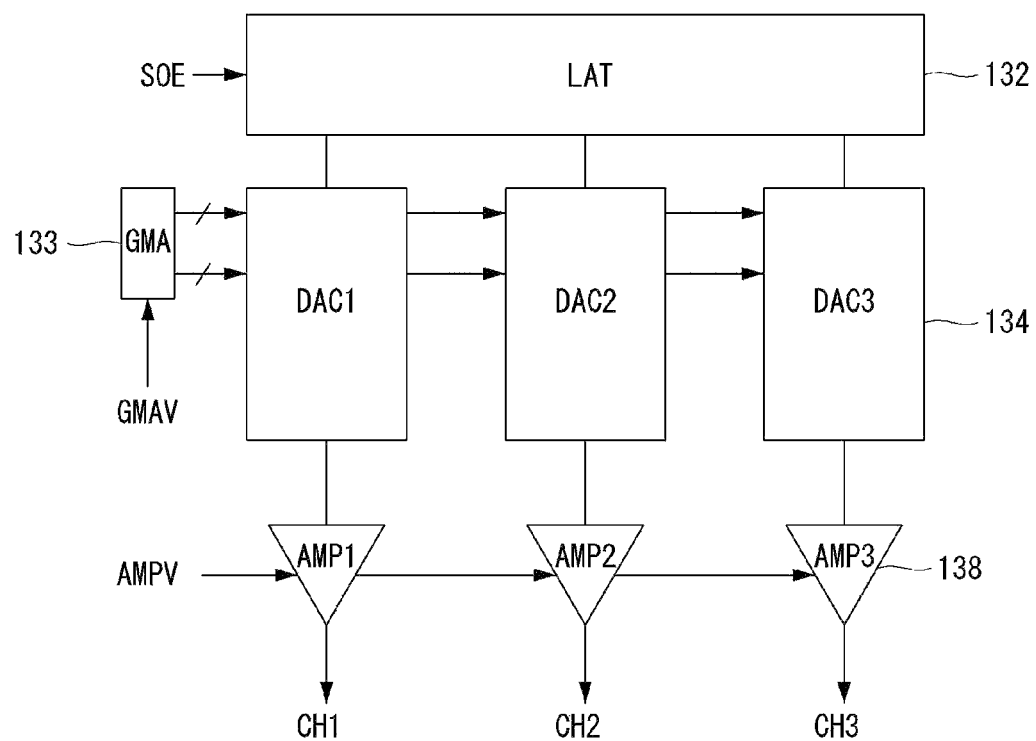
Figure 12:
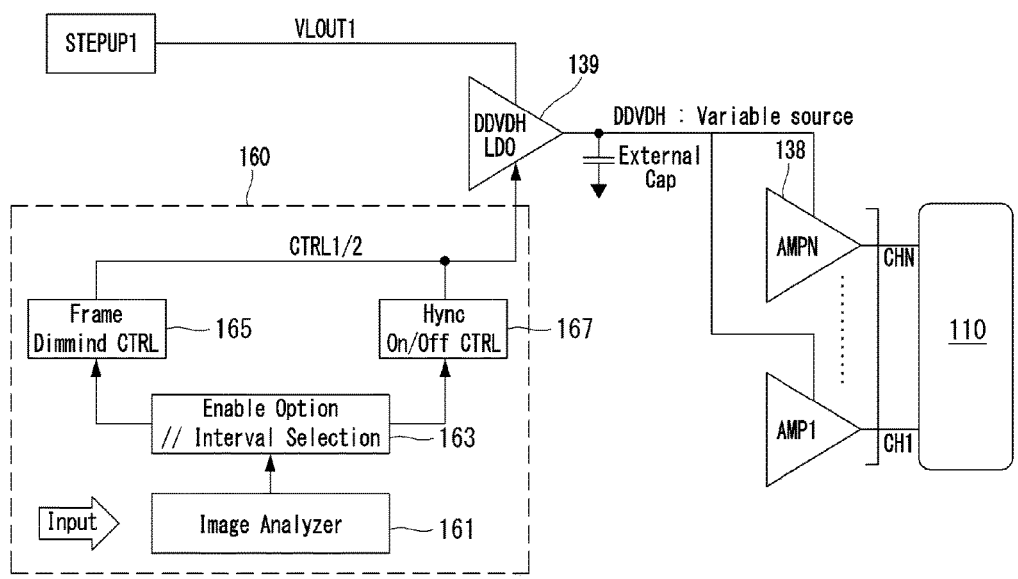
FIG. 12 illustrates an example of implementation of some parts of a display device according to an exemplary embodiment of the present disclosure.

FIGS. 10 and 11 are block diagrams for explaining the essential parts of a display device according to an exemplary embodiment of the present disclosure. FIG. 12 illustrates an example of implementation of some parts of a display device according to an exemplary embodiment of the present disclosure.

As illustrated in FIG. 10, a display device according to an exemplary embodiment of the present disclosure comprises a power saving part 160 for controlling the amplifier voltage AMPV supplied to the amplifiers AMP in the data driver 130.

The power saving part 160 comprises an image analyzer 161, a dimming method selector (Enable Option/Interval Selection) 163, a frame dimming controller (Frame Dimming CTRL) 165, and a horizontal dimming controller (Hsync ON/Off CTRL) 167.

The image analyzer 161 analyzes the format of an input image data signal. The image analyzer 161 determines whether the input image data signal is suitable for power-saving mode or normal mode. The image analyzer 161 determines whether the input image data signal corresponds to a built-in pattern or a pattern agreed upon with the user.

The dimming method selector (Enable Option/Interval Selection) 163 serves to select a dimming method suitable for the image when the display mode is switched to power-saving mode. The dimming method selector 163 decides which dimming method is more suitable for the input image's characteristics, and runs the frame dimming controller 165 or the horizontal dimming controller 167 according to the decided dimming method.

The frame dimming controller (Frame Dimming CTRL) 165 generates a first control signal CTRL1 for controlling the amplifiers in the data driver to enable per-frame dimming. In an example, in the per-frame dimming method, the amplifier voltage may be varied so that the amplifiers have a first amplifier voltage for an Nth frame, a second amplifier voltage for an (N+1)th frame, and a third amplifier voltage for an (N+2)th frame. In this case, the level of the amplifier voltage may be varied in the following order: first amplifier voltage→second amplifier voltage→third amplifier voltage, or in reverse order.

The horizontal dimming controller (Hsync On/Off CTRL) 167 generates a second control signal CTRL2 for controlling the amplifiers in the data driver to enable per-horizontal line dimming. In an example, in the per-horizontal line dimming method, the amplifier voltage may be varied so that the amplifiers have a first amplifier voltage for the data lines located on a first scan line, a second amplifier voltage for the data lines located on an (N+1)th scan line, and a third amplifier voltage for the data lines located on an (N+2)th scan line. In this case, the level of the amplifier voltage may be varied in the following order: first amplifier voltage→second amplifier voltage→third amplifier voltage, or in reverse order.

As illustrated in FIG. 11, the data driver comprises a latch circuit (LAT) 132, a gamma part (GMA) 133, a gamma converter (DAC) 134, an internal voltage generator 135, and amplifiers (AMP) 138.

The latch circuit 132 serves to latch on to and output an input data signal, in response to a source output enable signal SOE output from the timing controller. The latch circuit 132 consists of at least one latch.

The gamma converter 134 converts a digital data signal output from the latch circuit 132 to an analog data signal and outputs it, in response to a gamma voltage supplied from the gamma part 133. The gamma converter 134 consists of digital-to-analog converters DAC that convert a digital signal to an analog signal.

The amplifiers 138 serve to amplify the analog data signal output from the gamma converter 134 and output it through individual channels CH1 to CH3. The amplifiers 138 vary the amplification ratio in response to the amplifier voltage AMPV output from the amplifier voltage generator 139.

As illustrated in FIGS. 10 and 11, the first control signal CTRL1 and second control signal CTRL2 output from the frame dimming controller 165 and horizontal dimming controller 167 are supplied to the data driver 130. For example, the first control signal CTRL1 and the second control signal CTRL2 are supplied to the internal voltage generator 135 included in the data driver 130.

The internal voltage generator 135 has a circuit that generates a gamma converter voltage GMAV and a circuit that generates an amplifier voltage AMPV. Accordingly, when the first control signal CTRL1 or the second control signal CTRL2 is supplied to the internal voltage generator 135, either or both of the gamma converter voltage GMAV and the amplifier voltage AMPV are varied in response to it.

With this configuration, either or both of the static and dynamic currents in the data driver are varied in response to the first control signal CTRL1 or second control signal CTRL2 output from the power saving part 160.

A more concrete example of implementation of some parts of a display device according to an exemplary embodiment of the present disclosure, especially the parts associated with the amplifiers in the data driver, will be described below.

As illustrated in FIG. 12, the amplifiers AMP1 to AMPN of the data driver are driven by an internal power-supply voltage DDVDH. The internal power-supply voltage DDVDH output from the amplifier voltage generator 139 is defined as an amplifier voltage.

The amplifier voltage generator 139 generates the internal power-supply voltage DDVDH to drive the amplifiers AMP1 to AMPN, based on a voltage VLOUT1 output from a power source STEPUP1 provided internally or externally to the data driver.

The amplifier voltage generator 139 is implemented as a low dropout regulator LDO capable of varying the internal power-supply voltage DDVDH, in response to the first control signal CTRL1 or second control signal CTRL2 output from the frame dimming controller 165 and horizontal dimming controller 167.

With this configuration, the data driver may vary the amplifier voltage when power-saving mode is running during 1 frame period. Also, the data driver may drop the amplifier voltage AMPV to 0 V or the target voltage if there are data lines (corresponding to the non-display area) where no output is produced. As a consequence, the static current in the data driver may be reduced to close to zero, and as much dynamic current as needed for display area may be consumed. The unexplained part "External Cap" refers to an external capacitor (or sometimes, a parasitic capacitor) on a transmission line that exists externally to the output of the amplifier voltage generator 139.

Although the power saving part 160 has been illustrated and described as a separate block in the foregoing explanation, it may be included in the timing controller. Also, the timing controller with the power saving part 160 may consist of a single IC integrated with the data driver, depending on the size or method of implementation of the display device.

As described above, an embodiment of the present disclosure can reduce current consumption on a long-term basis by gradually decreasing an internal power-supply voltage—a reference source for the output of the data driver—on a per-frame basis by using a frame counter, etc. when the device goes into a power-saving mode.

Moreover, an embodiment of the present disclosure can reduce current consumption since even static current in a black pattern is turned off by turning on/off the internal power-supply voltage during a specific period (e.g., horizontal period) in a power-saving mode, based on a particular screen agreed upon with the user.

In addition, an embodiment of the present disclosure can reduce current consumption by varying either or both of a static current and a dynamic current in the data driver. Furthermore, an embodiment of the present disclosure can increase the battery's lifetime and usage time if a display device is implemented in a small size.

What is claimed is:
1. A display device comprising:
a display panel that displays an image;
a data driver that includes amplifiers to supply data signals to the display panel;
a power saving part that outputs a control signal according to a display mode of the display panel; and
an internal voltage generator that generates a gamma converter voltage to drive a gamma converter in the data driver and generates an internal power-supply voltage to drive the amplifiers in the data driver, wherein the internal voltage generator decreases the gamma converter voltage and the internal power-supply voltage in response to the control signal when the display mode of the display panel is switched to a power-saving mode, wherein the power saving part comprises:

an image analyzer that analyzes an input image and determines whether the display mode of the display panel is switchable to the power-saving mode, and a dimming method selector that determines whether the amplifiers in the data driver have different voltages on a frame-by-frame basis or a horizontal scan line by horizontal scan line basis depending on an analysis of the input image.

2. The display device of claim 1, wherein, when the display mode of the display panel is switched to the power-saving mode, one or more of a static current and a dynamic current in the data driver are reduced by the power saving part.

3. The display device of claim 1, wherein, when the display mode of the display panel is switched to the power-saving mode, one or more of a static current and a dynamic current in the data driver are reduced by the power saving part on a per-frame basis or a per-horizontal line basis.

4. The display device of claim 1, wherein, when the display mode of the display panel is switched to the power-saving mode, one or more of a static current and a dynamic current in the data driver drop to zero.

5. The display device of claim 1, wherein, when the display mode of the display panel is switched to the power-saving mode the internal voltage generator decreases the internal power-supply voltage to a target voltage or drops to 0 V with a gradient.

6. The display device of claim 1, wherein the power saving part comprises:

a frame dimming controller that generates a first control signal for controlling the data driver on the frame-by-frame basis; and a horizontal dimming controller that generates a second control signal for controlling the data driver on the horizontal line by horizontal line basis.

7. The display device of claim 6, wherein when the frame dimming controller generates the first control signal, the internal voltage generator varies the internal power-supply voltage so that a first voltage is supplied to the amplifiers for an Nth frame, a second voltage is supplied to the amplifiers for an (N+1)th frame, and a third voltage is supplied to the amplifiers for an (N+2)th frame.

8. The display device of claim 6, wherein when the horizontal dimming controller generates the second control signal, the internal voltage generator varies the internal power-supply voltage so that a first voltage is supplied to the amplifiers when a Nth scan line is scanned, a second voltage is supplied to the amplifiers when a second for an (N+1)th scan line is scanned, and a third voltage is supplied to the amplifiers when an (N+2)th scan line is scanned.

9. A method for driving a display device, the method comprising:

analyzing an input image to determine a display mode of a display panel;

selecting either a per-frame dimming or a per-horizontal line dimming when the display mode is a power-saving mode; and controlling a reference power for a data driver according to the selected dimming method by decreasing a gamma converter voltage to drive a gamma converter in the data driver and an internal power-supply voltage to drive amplifiers in the data driver, wherein the selecting either the per-frame dimming or the per-horizontal line dimming includes determining whether the amplifiers in the data driver have different voltages on a frame-by-frame basis or a horizontal scan line by horizontal scan line basis depending on an analysis of the input image.

10. The method of claim 9, wherein, in the controlling, one or more of a static current or a dynamic current in the data driver vary on a per-frame basis or a per-horizontal line basis.

11. The method of claim 9, wherein, in the controlling the internal power-supply voltage decreases to a target voltage or drops to 0 V with a gradient.

* * * * *